(12) United States Patent
Shaw

(10) Patent No.: US 6,751,673 B2
(45) Date of Patent: Jun. 15, 2004

(54) STREAMING MEDIA SUBSCRIPTION MECHANISM FOR A CONTENT DELIVERY NETWORK

(75) Inventor: David M. Shaw, Newton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 313 days.

(21) Appl. No.: 09/753,398

(22) Filed: Jan. 3, 2001

(65) Prior Publication Data
US 2002/0124098 A1 Sep. 5, 2002

(51) Int. Cl.$^7$ .............................................. G06F 15/16
(52) U.S. Cl. ...................... 709/231; 709/235; 709/238; 709/224; 709/217; 725/98
(58) Field of Search ................................ 709/231, 238, 709/230, 232, 203, 217, 235, 223, 205; 370/428; 725/87, 98

(56) References Cited

U.S. PATENT DOCUMENTS

| | | | | |
|---|---|---|---|---|
| 6,167,438 A | * | 12/2000 | Yates et al. | 709/216 |
| 6,195,680 B1 | * | 2/2001 | Goldszmidt et al. | 709/203 |
| 6,275,471 B1 | * | 8/2001 | Bushmitch et al. | 370/248 |
| 6,377,996 B1 | * | 4/2002 | Lumelsky et al. | 709/231 |
| 6,415,323 B1 | * | 7/2002 | McCanne et al. | 709/225 |
| 6,418,138 B1 | * | 7/2002 | Cerf et al. | 370/352 |
| 6,505,240 B1 | * | 1/2003 | Blumenau | 709/218 |

\* cited by examiner

Primary Examiner—Ario Etienne
Assistant Examiner—Abdullahi E. Salad
(74) Attorney, Agent, or Firm—David H. Judson; Locke Liddell & Sapp LLP (57) ABSTRACT

A reflector network is used within a content delivery network to enable requesting end users to subscribe to live streams that have been published to CDN entry points. A reflector is a generalized packet router program. The reflector network preferably comprises a hierarchy of reflectors that are located at the various entry points into the CDN, at each edge node at which requesting users may be directed by the CDN to obtain live streams, and at various "reflector" nodes located within at least one intermediate layer (in the hierarchy) between the entry points and the edge nodes. The edge nodes and each reflector node also include a manager program that arranges for feeds. When an end user is directed to an edge node that is not yet receiving the desired stream, the edge node's manager issues a subscription request to a set of reflector nodes. If the reflector node(s) are already receiving the desired stream, their reflector(s) begin sending it to the requesting edge node. If, however, the reflector node(s) are not already receiving the desired stream, their manager programs issue the subscription request to the entry point(s) to start the feed.

9 Claims, 4 Drawing Sheets

STREAMING MEDIA SUBSCRIPTION MECHANISM FOR A CONTENT DELIVERY NETWORK

RELATED APPLICATION

This application is related to application Ser. No. 09/478,571, now U.S. Pat. No. 6,665,726 which is titled METHOD AND SYSTEM FOR FAULT TOLERANT MEDIA STREAMING OVER THE INTERNET, filed Jan. 6, 2000, and assigned to the assignee of this application.

BACKGROUND OF THE INVENTION

1. Technical Field

The present invention relates generally to high-performance, fault-tolerant streaming media delivery in a content delivery network (CDN).

2. Description of the Related Art

Streaming media is a type of Internet content that has the important characteristic of being able to be played while still in the process of being downloaded. A client can play the first packet of the stream, and decompress the second, while receiving the third. Thus, an end user can start enjoying the multimedia without waiting to the end of transmission. Streaming is very useful for delivering media because media files tend to be large particularly as the duration of the programming increases. Indeed, for live events, the file size is, in effect, infinite. To view a media file that is not streamed, users must first download the file to a local hard disk—which may take minutes or even hours—and then open the file with player software that is compatible with the file format. To view streaming media, the user's browser opens player software, which buffers the file for a few seconds and then plays the file while simultaneously downloading it. Unlike software downloads, streaming media files are not stored locally on a user's hard disk. Once the bits representing content are used, the player typically discards them.

Streaming media quality varies widely according to the type of media being delivered, the speed of the user's Internet connection, network conditions, the bit rate at which the content is encoded, and the format used. In general, streaming audio can be FM quality, but, given typical bandwidth constraints, streaming video is poor by TV standards, with smaller screens, lower resolution, and fewer frames per second. The source for streaming media can be just about any form of media, including VHS or Beta format tapes, audio cassettes, DAT, MPEG video, MP3 audio, AVI, and the like. Prior to streaming, the content must first be encoded, a process which accomplishes four things: conversion of the content from analog to digital form, if necessary; creation of a file in the format recognized by the streaming media server and player; compression of the file to maximize the richness of the content that can be delivered in real-time given limited bandwidth; and, establishing the bit rate at which the media is to be delivered. Content owners typically choose to encode media at multiple rates so that users with fast connections get as good an experience as possible but users with slow connections can also access the content.

Non-streaming content is standards-based in the sense that the server and client software developed by different vendors, such as Apache server, Microsoft Internet Explorer, Netscape Communicator, and the like, generally work well together. Streaming media, however, usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. Streaming media clients are also often capable of playing standards-based non-streaming media files, such as WAV or AVI.

The three major streaming media formats in use today are: RealNetworks RealSystem G2, Microsoft Windows Media Technologies ("WMT"), and Apple QuickTime. RealSystem G2 handles all media types including audio, video, animation, and still images and text. RealSystem G2 and QuickTime support SMIL, an XML-based language that allows the content provider to time and position media within the player window. To deliver the media in real time Real and QuickTime use RTSP. To stream in WMT's Advanced Streaming Format, content providers typically must have Microsoft NT 4 Server installed. WMT does not support SMIL or RTSP but has its own protocol that it calls HTML+Time. Apple QuickTime recently has added the capability to serve streaming media. QuickTime can support a number of formats including VR, 3D, Flash, and MP3.

is well-known to deliver streaming media using a content delivery network (CDN). A CDN is a self-organizing network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

CDNs may use content modification to tag content provider content for delivery. Content modification enables a content provider to take direct control over request-routing without the need for specific switching devices or directory services between the requesting clients and the origin server. Typically, content objects are made up of a basic structure that includes references to additional, embedded content objects. Most web pages, for example, consist of an HTML document that contains plain text together with some embedded objects, such as .gif or .jpg images. The embedded objects are referenced using embedded HTML directives. A similar scheme is used for some types of streaming content which, for example, may be embedded within an SMIL document. Embedded HTML or SMIL directives tell the client to fetch embedded objects from the origin server. Using a CDN content modification scheme, a content provider can modify references to embedded objects so that the client is told to fetch an embedded object from the best surrogate (instead of from the origin server).

In operation, when a client makes a request for an object that is being served from the CDN, an optimal or "best" edge-based content server is identified. The client browser then makes a request for the content from that server. When the requested object is not available from the identified server, the object may be retrieved from another CDN content server or, failing that, from the origin server.

BRIEF SUMMARY OF THE INVENTION

A reflector network is used in conjunction with a content delivery network (CDN) to enable requesting end users to subscribe to live streams that have been published to CDN entry points. A reflector is a generalized packet router program. The reflector network preferably comprises a hierarchy of reflectors: at least one reflector located at each entry point to the CDN, at each edge node at which requesting users may be directed by the CDN to obtain live streams, and at various "reflector" nodes located within at least one intermediate layer (in the hierarchy) between the entry points and the edge nodes. The intermediate layer is useful to facilitate delivery of streams for which there is high demand. The edge nodes and each reflector node also include a manager program that arranges for feeds. When an end user is directed to an edge node that is not yet receiving the desired stream, the edge node's manager issues a subscription request to a set of reflector nodes. If the reflector node(s) are already receiving the desired stream, their reflector(s) begin sending it to the requesting edge node. If, however, the reflector node(s) are not already receiving the desired stream, their manager programs issue the subscription request up the hierarchy, ultimately reaching the entry point(s) to start the feed.

The foregoing has outlined some of the more pertinent features of the present invention. These features should be construed to be merely illustrative. Many other beneficial results can be attained by applying the disclosed invention in a different manner or by modifying the invention as will be described. Accordingly, other features and a fuller understanding of the invention may be had by referring to the following Detailed Description of the Preferred Embodiment.

DETAILED DESCRIPTION OF THE PREFERRED EMBODIMENT

Figure 1:
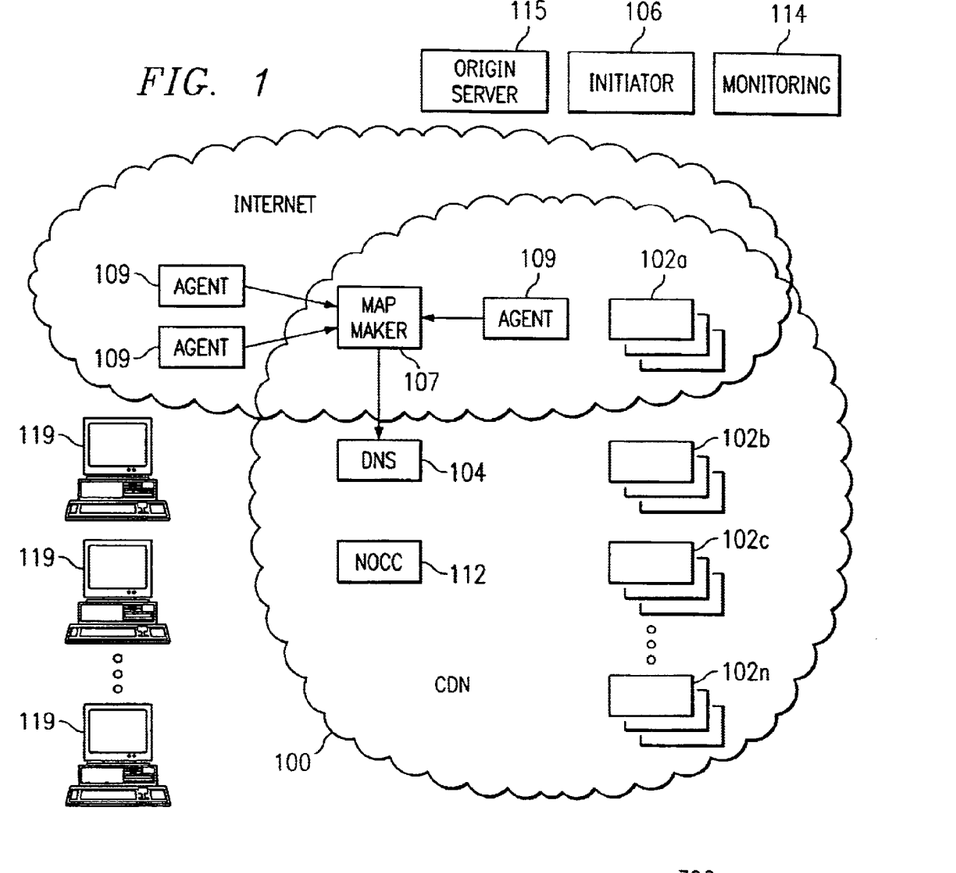
FIG. 1 is a block diagram of a known content delivery network in which the present invention may be implemented.

FIG. 1 is a diagram showing an illustrative content delivery service in which the present invention may be implemented. The invention may likewise be implemented with other known or later-designed or built content delivery services or systems. In the illustrative embodiment, the content delivery service comprises a preferably global content delivery network (CDN) 100 of content delivery server regions 102a–n, a domain name service (DNS) system 104, and a content modification or "initiator" tool 106 that allows content to be tagged for inclusion on the network. DNS system 104 receives network mapping data from a map maker 107, which receives inputs from monitoring agents 109 distributed throughout the Internet. Agents typically perform various tests and monitor traffic conditions to identify Internet congestion problems. The map maker 107 takes the data generated from the agents and generates one or more maps detailing Internet traffic conditions. Generally, the content delivery service allows the network of content delivery server regions 102a–n to serve a large number of clients efficiently. Each region may include one or more content servers, with multiple content servers typically sharing a local area network (LAN) backbone. Although not meant to be limiting, a typical server is an Intel Pentium-based caching appliance running the Linux operating system with a large amount of RAM and disk storage. As also seen in FIG. 1, the content delivery service may include a network operations control center (NOCC) 112 for monitoring the network to ensure that key processes are running, systems have not exceeded capacity, and that subsets of content servers (the so-called CDN regions 102) are interacting properly. A content provider operates an origin server (or server farm) 115 from which requesting end users 119 would normally access the content provider's Web site via the Internet. Use of the CDN avoids transit over the Internet for selected content as described below. The content provider may also have access to a monitoring suite 114 that includes tools for both real-time and historic analysis of customer data. One tool is a traffic analyzer that provides multiple monitoring views that enable quick access to network and customer-specific traffic information. A reporter allows for viewing of historical data. A billing tool may be used to generate appropriate billing information for the content provider, who typically pays for the service as a function of the amount of content delivered by the CDN.

High-performance content delivery is provided by directing requests for web objects (e.g., graphics, images, streaming media, HTML and the like) to the content delivery service network. In one known technique, known as Akamai FreeFlow Streaming content delivery, content is first tagged for delivery by the tool 106, which, for example, may be executed by a content provider at the content provider's web site 115. For streaming content, the initiator tool 106 converts URLs that refer to streaming content to modified resource locators, called ARLs for convenience, so that requests for such media are served preferentially from the CDN instead of the origin server. For example, the tool prepends each streaming URL with a string containing a CDN domain and, optionally, additional control information. For the URL rtsp://www.foo.com/movie.mov, for example, the corresponding ARLs may look like as follows:

Live or Broadcast:
WMT: mms://a9.m.akastream.net/...(control info)/reflector:35001
Real: rtsp://a9.r.akareal.net/live/...(control info)/reflector:35001
QT: rtsp://a9.q.kamai.net/...(control info)/www.mysite.com/movie/sdp Video or Audio on Demand:
WMT: mms://a9.m.akamstream.net/...(control info)/www.foo.com/movie/asf
Real: rtsp://a9.r.akareal.net/ondemand/...(control info)/www.foo.com/movie.rm
QT: rtsp://a9.q.kamai.net/...(control info)/www.foo.com/movie.mov.

Of course, the above formats are merely illustrative. When an Internet user visit's a CDN customer's site (e.g., origin server 115) and selects on a link to view or hear streaming media, the user's system resolves the domain in the ARL to an IP address. In particular, because the content has been tagged for delivery by the CDN, the URL modification, transparent to the user, cues the Internet's standard Domain Name Service (DNS) to query a CDN name server (or hierarchy of name servers) 104 to identify the appropriate media server from which to obtain the stream. The CDN typically implements a request-routing mechanism (e.g., under the control of maps generated from the monitoring agents 109 and map maker 107) to identify an optimal server for each user at a given moment in time. Because each user is served from the optimal streaming server, preferably based on real-time Internet conditions, streaming media content is served reliably and with the least possible packet loss and, thus, the best possible quality. Further details of a preferred DNS-based request-routing mechanism are described in U.S. Pat. No. 6,108,703, which is incorporated herein by reference.

Figure 2:
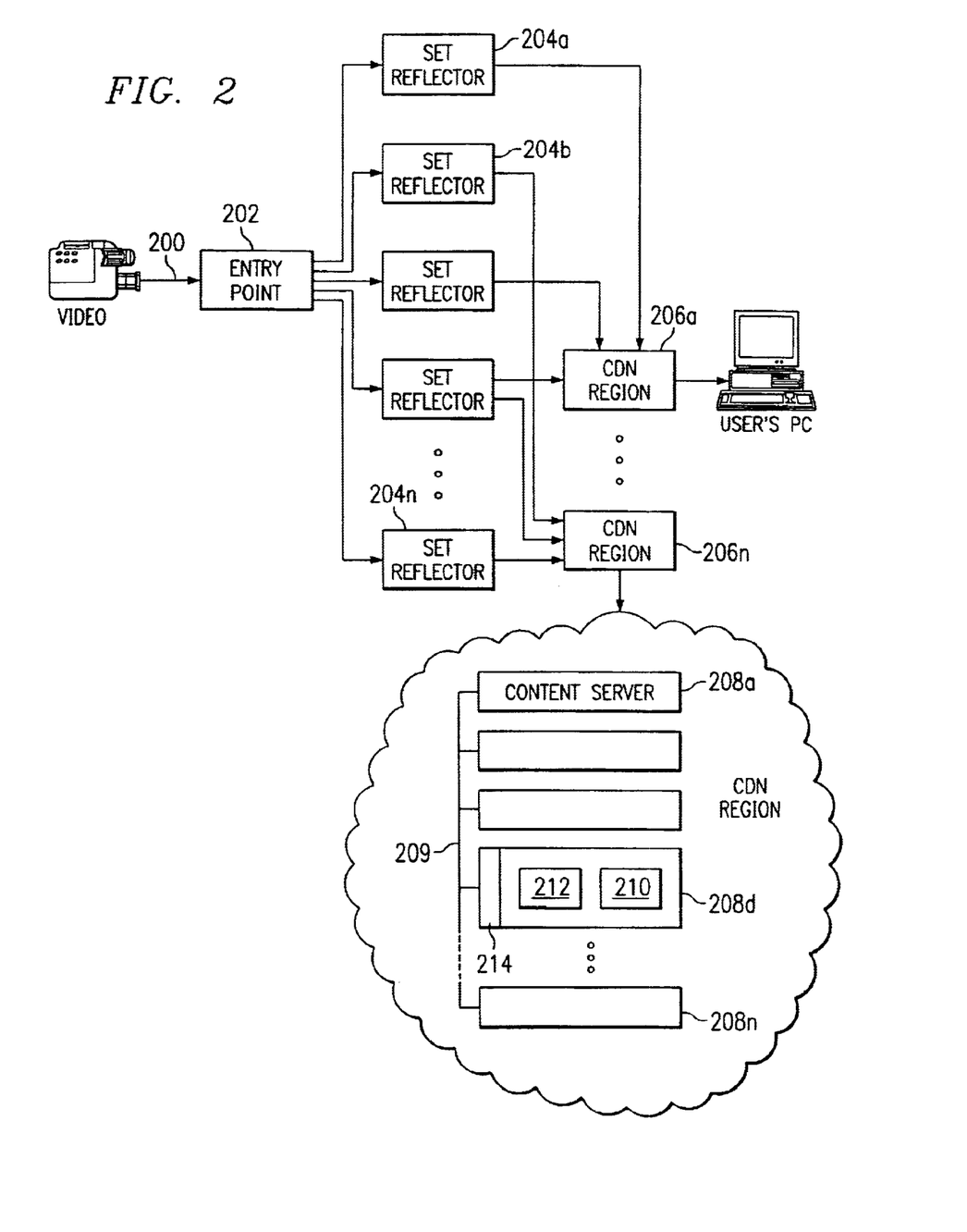
FIG. 2 is a simplified diagram illustrating how live streaming can be further enhanced by having the CDN send multiple copies of the same stream over different routes from a CDN entry point to the optimal streaming server at the edge of the Internet.

As described in copending application Ser. No. 09/478,571, which is also incorporated herein by reference, live streaming can be further enhanced by having the CDN send multiple copies of the same stream over different routes from a CDN entry point to the optimal streaming server at the edge of the Internet. These copies are then combined to form one complete, original-quality stream, which is sent from the streaming server to the end users. FIG. 2 illustrates this process in more detail. A broadcast stream 200 is sent to a CDN entry point 202. An entry point, for example, comprises two servers (for redundancy), and each server can handle many streams from multiple content providers. Once the entry point receives the stream, it rebroadcasts copies of the stream to set reflectors 204a–n. The streams are multiplexed and delivered to the set reflectors preferably via UDP (e.g., WMT encapsulated in RTSP encapsulated in UDP over IP). These set reflectors are preferably diverse from a network and geographic standpoint (e.g., at diverse Internet backbone data centers) to ensure fault tolerance. Each set reflector, in turn, rebroadcasts its copy of the stream to each subscribing region, e.g., region 206d, of a set of regions 206a–n. A subscribing region 206d is a CDN region that contains one or more streaming edge nodes 208a–n to which user(s) have been routed by the CDN request-routing mechanism. In other words, set reflectors send their streams to every edge region where they are needed. A CDN region, in this example, includes a set of edge nodes connected by a common backbone 209, e.g., a local area network (LAN). Typically, an edge node, e.g., node 208d, comprises a streaming server 212 and it may include a cache 210. A representative server runs an Intel processor, the Linux operating system and a Real Media or QuickTime Server. For Windows-based platforms, a representative server runs an Intel processor, Windows NT or 2000, and a Windows Media Server. As will be described, the edge node also runs control programs 214 to facilitate the inventive subscription mechanism.

Each subscribing region, then, simultaneously receives multiple copies of the streamed content. These copies have been sent via separate routes over the Internet, so congestion resulting in dropped packets is unlikely to impact each copy of the stream equally. As described in copending Ser. No. 09/478,571, each region preferably has a mechanism to recreate in real time an original version of the stream as sent to the entry point. In this way, the technique compensates for the inherently faulty Internet and inherently lossy UDP transport protocol. The reassembly mechanism within each region makes the original, verbatim stream available to every streaming media server within that region. When a user clicks on a CDN-tagged stream, the stream is delivered from the optimal edge node (and, in particular, that node's streaming media server) identified by the CDN's request-routing mechanism. If the CDN maps a user to a node in a region which has not subscribed to that broadcast stream (which, for example, is true for the first connection served from that region), the region automatically notifies the set reflectors and subscribes to that stream using the present invention, as will now be described.

The subscription mechanism of the invention preferably comprises a set of generalized, modular programs that are relatively easy to maintain and deploy. It is preferably used for "live" streaming. This means a data stream that carries data that is intended to be operated on in more-or-less real time. Video on demand (VOD) is data that can be operated on at any point. For example, a TV station is live, and a videotape is VOD. There is some overlap, as a videotape or VOD can be broadcast or streamed as if it was live. As used here, "live" encompasses both of these uses.

Figure 3:
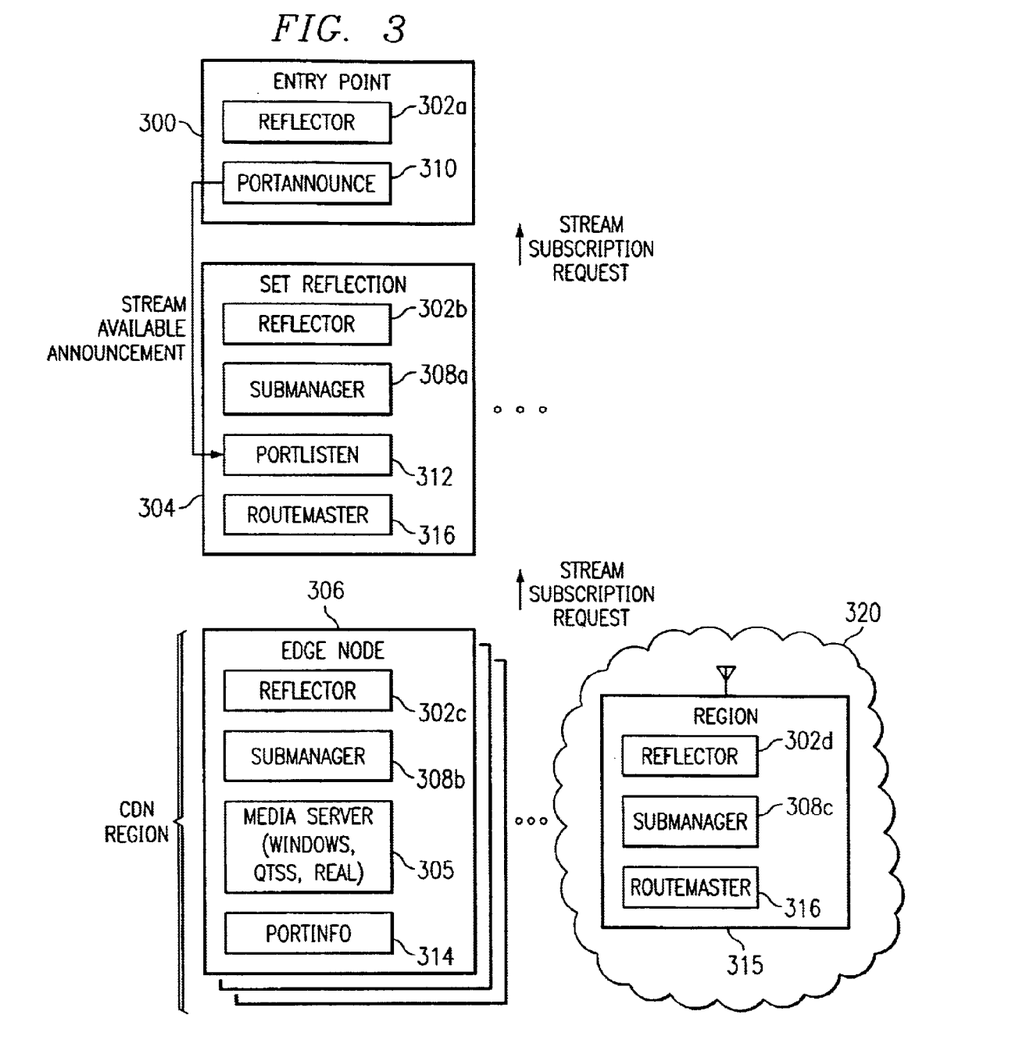
FIG. 3 is a simplified diagram illustrating a reflector subscription mechanism according to the present invention.

With reference now to FIG. 3, the main program, called reflector, is a generalized packet moving engine, essentially an application-level router for UDP packets. The reflector moves packets using unicast, multicast or broadcast. Also, the reflector program conditionally sends particular streams to particular places. A reflector can be configured to do this via a static configuration file or, in accordance with the present invention, by learning the configuration via subscription messages on the network. As can been seen in FIG. 3, an entry point 300 includes a reflector program 302a, each set reflector machine 304 includes a reflector program 302b, and each edge node 306 includes a reflector program 302c. The edge node 306 also includes a streaming media server 305 as has been previously described. Entry point 300 also runs a streaming media server.

Thus, in the preferred embodiment, the reflector program runs in three (3) distinct layers of the streaming network hierarchy comprising entry point(s) at the top level, set reflectors in the intermediate layer, and region(s) of one or more edge nodes at the lower level. Additional set reflector layers can be implemented as well for scalability. Generally, the reflector program works using "listener" and "destination" methods as follows. A listener may be one of these types:

Listener Types
    RTP—Real Time Protocol
        The Real Time Protocol as per RFC 1889. In the context of the reflector, this is treated as an arbitrary chunk of data (like NOOP) except that statistics may be kept using packet sequence numbers. This listener type is used for Apple QuickTime, which is standards-compliant.
    NOOP—No Operation
        Just move the packet, and do not act on any information within. This is essentially the same as RTP without the statistics. Because NOOP has no sequence number, there is no way to keep statistics on lost, out of order, or duplicate packets. This does not prevent the application from providing its own sequence numbering within the packet. This listener type is used for WMS.
    MUX—Multiplex
        This is the packet type generated by a MUX destination (see below). It can contain packets of either RTP or NOOP type.

In an representative embodiment, there is one RTP and one NOOP listener per listening port. This portrange is specified in a configuration file. MUX listeners always listen on a dedicated port, e.g., port 1455. The specific address being listened on can be unicast, multicast, or broadcast. In general, an entry point in the hierarchy will have RTP and/or NOOP listeners, while a set reflector will have a MUX listener.

Destinations can be one of these types:
Destination Types
    NOOP—No Operation
        As before, just move the packet, and do not act on any information within.
    MUX—Multiplex
        Takes data of any type and sends it in a multiplexed "megastream".
    DEMUX—Demultiplex
        Takes a multiplexed packet (generated by a MUX destination) and reconstruct the original RTP or NOOP packet from it.
    SMARTDEMUX—Demultiplex (more) intelligently
        This is the same as DEMUX, except it consults the subscription list from the local server (the portinfo library) and only sends the packet if it is part of a feed being subscribed to. This allows for higher performance at the edge nodes.

Generally multiple input streams (received over a listener) are combined into a single megastream for sending to a given destination. For example, if there are two RTP listeners on two separate RTP ports, then these may be combined into a single multiplexed megastream for transmission to single destination. Note that there is no RTP destination type. Instead, NOOP is used to indicate that no processing should be done to the packet. For convenience, the reflector will accept RTP as a destination and, instead, use NOOP internally.

To allow the reflector to work dynamically and to learn its configuration from the network (rather than from a configuration file), the present invention implements a subscription function. In a preferred embodiment, subscriptions flow from an intended receiver of the data to the sender and, thus, the receiver controls the sender's "destination" configuration. To use subscriptions, a message is sent to the reflector, and this list contains a list of ports that the recipient wants. If the reflector is already sending a feed to that particular destination, it will be changed to correspond to the subscription message. If, however, the reflector is not already sending a feed to that particular destination, a new destination is added. The reflector optionally can either use the source address of the subscription as the new destination address, or for situations when this is impossible (multicast or broadcast addresses, or just addresses that are not local to the subscriber), the reflector can be told which address to use as the destination. In order to "chain" reflectors, the reflector program can operate in a self-server mode. This makes the reflector act as its own server, so that when the reflector gets a subscription for a feed, it, in turn, subscribes for it itself. This function is used on set reflectors to chain subscriptions up to the entry points as will be described. In the illustrative embodiment, subscription messages are authenticated using, for example, a cryptographic signing system that ensures that subscription messages will only be accepted from systems that are built with the proper authorization key.

Each set reflector 304 and each edge server 306 preferably also includes a submanager program 308. Thus, for example, set reflector 304 includes submanager program 308a, while edge server 306 includes submanager program 308b. The submanager is a tool that arranges for feeds. Generally, the submanager listens to the server running on the same machine, and it uses the requests to send subscription messages to a reflector (higher up in the hierarchy) to start the feed. The submanager operates to guarantee high availability. The submanager may be used alone or in a cluster, which is the typically configuration within a CDN region having multiple edge servers. When used in a cluster, the submanager implements the following "leader" algorithm:

The Leader Algorithm
1. Announce a local subscription list to all other submanagers and listen for the lists from other submanagers in the region;
2. Merge together the lists received from the other submanagers in the region
3. Elect a number (e.g., three(3)) of leaders by the following:
   Sort the list of responses by IP address
   Remove any machines that have not been heard from over a given period (e.g., 20 seconds)
   Take the top three.
4. All leaders send a subscription message to turn on the feeds for the region. As a result, there are three feeds incoming to each region.

When used alone, this leader algorithm is not used. Instead, a simple subscription is done for each port requested by the local server. When used in a cluster, the leader election algorithm is used to remove dead machines. If a machine dies, it will disappear from the list of machines. If a leader dies, then all the machines that come after it in the list will be promoted one step. This helps guarantee good service to all the servers in the region.

Although not meant to be limiting, there are preferably two (2) methods where the submanager decides what to do with a subscription to a particular port.
DNS
    When using the DNS system, the submanager will attempt to look up an address of the form: nleader number.rregion number.ref.akamai.com. (For example, leader 2 in region 5 will look up n2.r5.ref.akamai.com.) All subscriptions are sent to that address. This is the method preferably used between the edge reflectors and the set reflectors because it allows the submanager to be dynamically mapped to the best set reflector.

porttable

A porttable structure is built in memory (and populated by portlisten, for example). This table contains an IP address per port, so each feed can come from a different source with single-port granularity. This is the method used between the set reflectors and entry points.

Referring now back to FIG. 3, each entry point 300 also preferably includes a portannounce function 310 (which may be a separate program or a thread within the reflector process) that watches a reflector's input and announces all ports available through this reflector to a corresponding portlisten function 312 running on the set reflectors. The portlisten function 312 listens for messages from various portannounce functions 310 (on the entry points) and builds a porttable for the submanager program to use in the subscription process. A portinfo library 314 is a library that can be linked into any streaming media server program running on an edge server platform. It is used to provide the submanager (running on the edge server platform) with the list of ports that the server wants so that the submanager can set up the subscriptions. A routemaster program 316 commmunicates with reflectors, learning what streams are needed and where. If needed, it then makes a real time decision on how to route the streams to best optimize the system based on quality of stream, cost of a particular route, and so on.

Thus, in an illustrative embodiment, an entry point runs reflector and portannounce, each set reflector runs reflector, portlisten and submanager, and each edge server platform runs reflector, submanager, and a streaming server that uses the portinfo library. Preferably, a number of reflectors are deployed in strategic places around the Internet to create the entry points. The goal is to have an entry point near the content provider. The content provider sends its live stream to an entry point, which uses portannounce to announce to the set reflectors the availability of the new stream. Because an entry point is just a machine running reflector and does not involve any special hardware, rapid deployment is easy. An entry point preferably comprises two computers with a shared backend, although this is not a requirement. Entry points preferably run a failover mechanism to ensure availability. The set reflectors likewise are located, preferably around the world, in strategic locations. Each set reflector uses its submanager to subscribe to the entry points for feeds as needed, namely, the feeds requested to by the edge nodes. The reflector in each set reflector preferably runs in self-server mode while the submanager therein runs in porttable mode, with the porttable being populated by portlisten. The edge node is what serves actual users. As noted above, the edge node runs a media server (e.g., QTSS, WMS, or Real Media) along with reflector and submanager. Preferably, edge nodes are arranged in regions, although this is not a requirement. A given region comprises about ten (10) edge machines sharing a common backbone.

As also illustrated in FIG. 3, a given region 320 may comprise a satellite region that runs a satellite uplink node 315 running reflector 302d and submanager 308c. Generally, satellite uplink nodes do not run servers; rather, they are controlled by the routemaster program and are told to subscribe for the feeds that the routemaster has decided to put on the particular satellite to which the node is connected. Any data received by reflectors in an uplink region preferably is sent to the satellite.

Although not meant to be limiting, a given set reflector node is a machine running a Pentium III-class processor, the Linux operating system kernel, and that includes suitable system memory and disk storage to support the application programs described above. A given entry point may have a similar configuration together with additional programs (e.g., an encoder, a content initiator tool, etc.) as needed to publish the live streams to the CDN. A set reflector is made up of set reflector nodes.

Figure 4:
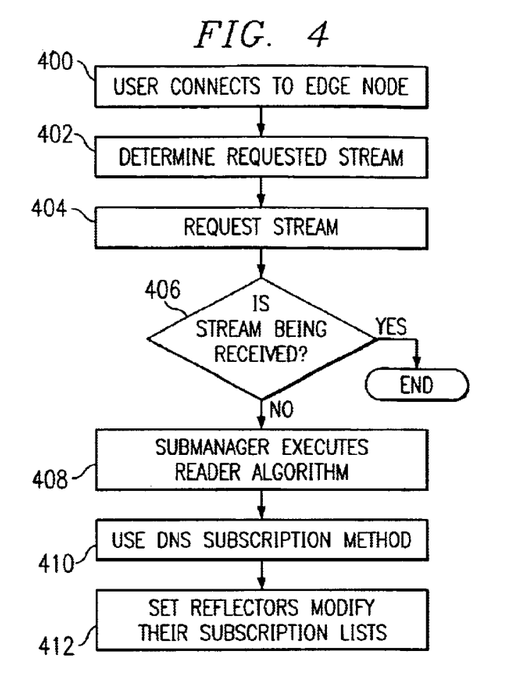
FIG. 4 is a flowchart illustrating an operation of the inventive subscription mechanism at the edge node to which a requesting end user has been directed by the CDN.

FIG. 4 is a flowchart illustrating the operation of the subscription mechanism at an edge node in the preferred embodiment. The routine begins at step 400 when a user connects to an edge node using, for example, the CDN request-routing mechanism. In particular, the flowchart assumes that the streaming media is ready to be delivered over the streaming CDN, that the requesting user has clicked on a link identifying the stream, and that he or she has been routed to the optimal server by the CDN. The particular methods by which these conditions are achieved are outside the scope of the present invention, and any convenient known or later-developed CDN technology and services may be used for this purpose. At step 402, the streaming media server at the particular edge node to which the user has been routed receives the request and determines which live stream the user wants. At step 404, the streaming media server at the edge node uses the portinfo library to request the stream. A test may then be performed at step 406 to determine whether the streaming media server at the edge node is already receiving the stream (e.g., if another user is playing the stream from that server or a server in the same region). This step may be omitted if multiple subscriptions to a particular stream are treated as a single subscription request. If the outcome of the test is positive, the routine ends. If, however, the outcome of the test at step 406 is negative, the routine continues at step 408.

At this step, the submanager running on the edge node executes its leader algorithm which, as noted above, involves contacting the submanagers running on other edge nodes in the region and determining a set of leaders. The routine then continues at step 410 to use the DNS subscription method to send subscriptions to the set reflectors. According to the subscription method, when the submanager looks up a given domain name, e.g., n<leader>.r<physicalregion>.ref.akamai.com, the DNS server returns the set reflector that is best able to provide the requested megastream and will return one of the three IP addresses based on the n1, n2 or n3 hostname in the domain name. Returning to the flowchart, the routine then continues at step 412 with the set reflectors modifying their subscription lists for the three leaders and then begin sending the new streams requested.

Figure 5:
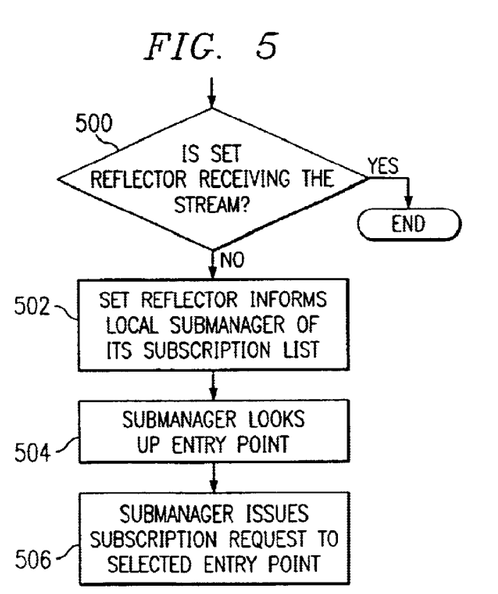
FIG. 5 is a flowchart illustrating an operation of the subscription mechanism at a set reflector node according to the present invention.

Processing then moves up the hierarchy. In particular, FIG. 5 is a flowchart illustrated the operation of the subscription mechanism at a given set reflector. The routine begins at step 500 by testing to determine whether the set reflector is already receiving the stream (e.g., if a region somewhere that uses this set reflector is already receiving it). This step is optional if multiple subscriptions to a particular stream are treated as a single subscription request. If the outcome of the test is positive, the routine ends. If, however, the outcome of the test at step 500 is negative, the routine continues at step 502 with the set reflector, using the self-serving function, informing the local submanager (namely, the submanager running on the set reflector machine) its subscription list. At step 504, the submanager (using porttable, which is populated by portlisten) looks up which entry point has the stream. At step 506, the submanager sends a subscription message to the selected entry point to start the feed to the requesting set reflector. This completes the processing at each set reflector.

Figure 6:
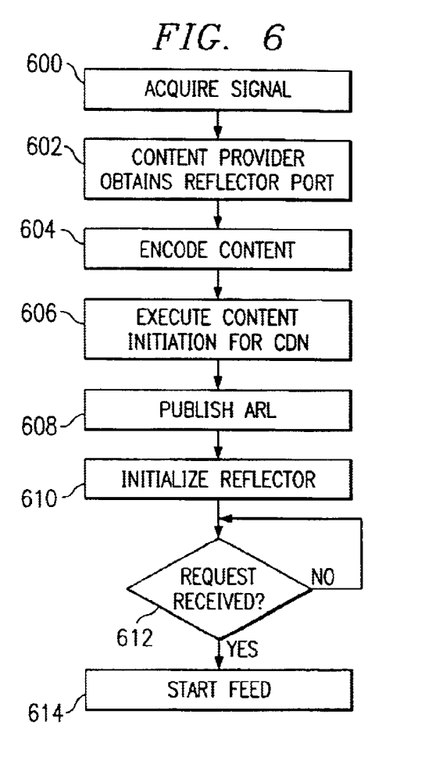
FIG. 6 is a flowchart illustrating an operation of the subscription mechanism at an entry point according to the invention.

FIG. 6 is a flowchart illustrating the operation of the subscription mechanism at a given entry point. The routine begins at step 600 with the content provider or other third party acquiring the signal containing the live content. The signal can be sent over the public Internet, ISDN, satellite, or any other convenient means. At step 602, the provider contacts the CDN and obtains a reflector port and best entry point address. Typically, the CDN will have deployed entry points around the Internet, and the CDN can identify the best entry point for the provider's encoder and, per step 602, provide its IP address. A given customer may be assigned a unique username and password to validate their stream on the entry point. In addition, the entry point may be instructed regarding which CIDR blocks on the Internet may stream data to the entry point. At step 604, the content to be streamed is encoded. The encoding function, of course, is dependent on the streaming format used. For Windows-based media, the provider can run Windows Media Encoder to encode the content into the desired bit rate(s) and format (s). For Real content, the provider can use the RealProducer encoder. For Apple QuickTime, the provider can run a Sorensen Broadcaster on a QuickTime streaming server. At step 606, the content initiation tool is run to modify URLs that refer to the streaming media objects. Representative ARLs produced by this process were illustrated above. At step 608, the ARL is published. Thus, for example, for Windows media, the ARL is published through ASX files and Web pages. For Real content, the ARL is embedded in RAM files, SMIL files or Web pages. For Apple QuickTime, the ARL is embedded in Web pages or within reference movies or wired sprite movies.

At step 610, the entry point reflector program is initialized and waits to receive subscription requests from the set reflectors. Steps 606 and 608 may be performed in parallel to step 610. A test is performed at step 612 to determine whether a request has been received by the portannounce function. If not, the routine cycles. When the outcome of the test at step 612 is positive, portannounce has received a subscription request from a corresponding portlisten in a set reflector. At step 614, the reflector starts the feed to the subscribing set reflector.

The subscription mechanism of the present invention may have several variants. Of course, any number of set reflectors may be used within the intermediate layer to provide improved fault tolerance. Moreover, instead of using a static configuration, the mechanism may selected set reflectors dynamically (where a given number of set reflectors are selected from a pool using DNS). Further, entry points may also be selected dynamically instead of merely a hard configuration, i.e., by providing an IP address to a content provider customer. In addition, it may be desirable to provide intelligent region overflow when a region that is subscribing to many live feeds is unable to receive more streams. A busy region may overflow live traffic to other regions. Moreover, it may be unnecessary to have a submanager at a given edge node to request a given number of incoming streams, especially in well-connected areas. Thus, the submanager may be programmed so that it only requests a stream if the current number of incoming streams is insufficient.

Satellite Operation

As is well-known, satellite transport of Internet Protocol (IP) data has very different semantics than land line transport. One uplink of data can be downlinked in countless places with no additional work. This "one to many" semantic makes satellite transport ideal for distribution of live streams. Moreover, satellites generally are not as lossy as the public Internet; thus, if a clean stream can be uplinked, it will generally be cleaner on downlink than it would be traveling over the public Internet. Unfortunately, however, satellites also have several disadvantages—first, their high cost as compared to land lines. Like all transport mechanisms, any loss at the head end is faithfully delivered to the tail end. Thus, given the many potential downlinks, this loss is more expensive to bear.

Figure 7:
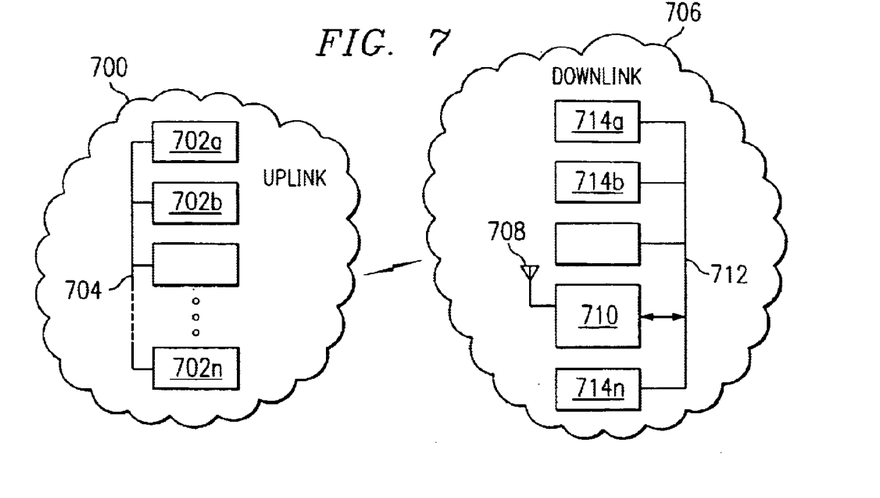
FIG. 7 is a simplified block diagram illustrating how a satellite region may utilize the reflector subscription mechanism of the invention.

The low loss characteristics of satellite transport can be exploited by using the techniques described in copending application Ser. No. 09/478,571. As was described above, a given CDN region may comprise a satellite region that runs a satellite uplink node running reflector and submanager. The reflector-based satellite system maximizes the usefulness of any particular piece of satellite transit. (The reflector cannot do anything about the cost of satellite, but it can arrange to make the most use out of the expensive bandwidth.) As illustrated in FIG. 7, an uplink center 700 comprises a standard CDN region configuration wherein machines 702*a–n* share a private backend network 704. These machines run reflector and submanager as has been previously described. Generally, these machines do not run a streaming server and users are not mapped to them. At the downlink, i.e., some other CDN edge region 706, a satellite antenna 708 and its associated hardware 710 is connected to provide its data, preferably in multicast for, onto the backend network 712 in the region. Machines 714*a–n* are the edge nodes, and each runs reflector and submanager, together with a streaming server as has been described previously.

The set reflectors have a lot of information regarding the state of the system. Specifically, they know what streams every region is requesting. Combining this knowledge with a list of which regions have satellite downlink capability (and from which satellite vendor), and the cost of using each satellite vendor at the particular time, it can be calculated whether it is justifiable to uplink some streams. If so, an uplink message is sent to the uplink region 800, which responds as if it was a regular region—by subscribing to the stream using the subscription method described above. This ensures a clean stream to be uplinked. The data is then converted to multicast and injected into the satellite uplink. When the data starts showing up on the downlink side, the reflector and submanager, seeing a clean stream mixed with the data arriving over the public Internet, preferably unsubscribes from the land line versions of the stream and uses the satellite only. The system then can switch back and forth between land line and satellite use (and any mixture of the two in the case of loss) very quickly (seconds). Thus, a satellite failure, e.g., due to weather or hardware failure, can be immediately and automatically rectified. The following describes one technique for determining whether and from where to uplink a given stream. As noted above, the calculation is carried out by the routemaster and may use various pieces of information, such as the cost (to the CDN) of different satellite companies, the cost of bringing the stream to the uplink center (which typically needs to occur via land lines), the number of regions that are viewing the stream, the number of regions that have satellite dishes, and which satellites the dishes are aimed at. As a concrete example, assume that 100 regions are watching a stream, 50 of those regions have satellite dishes, 20 of these dishes are pointed to a first satellite (e.g., Loral), the other 30 are pointed to a second satellite (e.g., Hughes), the CDN pays a given first amount (e.g., $0.50 per megabyte) on the first satellite and a given second amount (e.g., $0.80 per megabyte) on the second satellite. Also, it is assumed that the cost to deliver the stream via land line is a given amount (e.g., $0.10 per megabyte). Thus, the CDN pays 100*(0.10)=$10 per megabyte to deliver the stream via land lines to the 100 regions.

If the CDN switches to the first satellite, it will pay 80*(0.10)=$8 per megabyte for the regions that do not have satellite dishes, plus 1*(0.50)=$0.50 per megabyte for the single Loral uplink, for a total of $8.50. Looking at the second satellite, the CDN pays 70*(0.10)=$7 for the regions without dishes, plus 1*(0.80)=$0.80 for the single Hughes uplink, for a total of $7.80 per megabyte. Thus, the Hughes link is cheaper than the Loral link. This type of calculation may be carried out on a regular basis to continually reevaluate the cost of the stream being uplinked to which satellite. If there were another stream that saved the CDN more, the CDN could then uplink to that stream. Although in the above example cost is an important metric, other factors may be considered by the routemaster algorithm in order to evaluate when to uplink. Thus, for example, if many regions are unable to get high quality streams (due to Internet problems on their inbound side), the routemaster can uplink to the satellite to bypass that congestion. Or, if there are many overseas regions, a satellite uplink may be used to avoid transoceanic lines, which are often lossier and slower than U.S. lines. Of course, the above are merely exemplary.

It is also desirable to fill the satellite bandwidth as such bandwidth has a fixed cap. If the CDN is paying a fixed cost for the satellite bandwidth, the CDN desires to use that bandwidth as fully as it can. By using the above-described technique, various streams with different bitrates may be selected to enable the CDN to fill that bandwidth as much as possible. The calculation may also take into consideration whether the CDN is paying a variable cost for such bandwidth. The above-described technique is quite useful as satellite companies do not have an effective means to make the "use or not use" decision on their satellites, and the process of uplinking a given stream is often performed manually. The technique is automated and always seeks to use the satellite to its best advantage.

Many of the functions described above have been described and illustrated as discrete programs. One of ordinary skill will appreciate that any given function, alternatively, may comprise part of another program. Thus, any reference herein to a program should be broadly construed to refer to a program, a process, an execution thread, or other such programming construct. As a concrete example, the programs referred to above as submanager and reflector may run as separate threads within a larger program. Generalizing, each function described above may be implemented as computer code, namely, as a set of computer instructions, for performing the functionality described via execution of that code using conventional means, e.g., a processor, a machine, a set of connected machines, a system, etc.

Summarizing, in the illustrative embodiment, the reflector network deployment preferably comprises three (3) layers: entry points, set reflectors and edge nodes. Each entry point sends multiple unicasts to the set reflectors; each set reflector receives streams from multiple entry points and then sends a multiplexed stream to a subset of the edge nodes; each edge node is preferably within a CDN region hosting the streaming servers and receives multiple copies of the multiplexed stream from some subset of the set reflectors and then broadcasts them over their backend network so that all servers in the region see all of the streams. Of course, a given region may only include one streaming server (namely, a single edge node), which does not impact the subscription mechanism previously described except to the extent it obviates execution of the leader algorithm. In addition, one of ordinary skill will appreciate that the use of the intermediate layer may be unnecessary with respect to a subscription request for a stream for which there is little demand.

In addition, the reflector network and its associated subscription mechanism described herein may be used for generalized delivery of any type of data. Thus, for example, the reflector network to publish content provider metadata to CDN edge nodes. As another example, the network and subscription mechanism may be used as a tool for populating edge node caches with content to be served from the CDN.

I claim:

1. A subscription mechanism for use in a content delivery network (CDN) having a set of content provider entry points, an intermediate layer of set reflectors, and a set of edge nodes to which requesting end users are selectively directed to obtain live data streams that are published to the CDN, wherein an edge node includes a server for delivering the live data streams to requesting end users, the mechanism comprising:

code operative at the edge node (a) for determining whether the edge node server is already receiving a live data stream being requested by an end user at the time of such a request from the end user; and (b) for issuing to at least one set reflector a subscription to the live data stream if the edge node server is not already receiving the live data stream, the subscription originating from the edge node; and code operative at the set reflector for (a) determining whether the set reflector is already receiving the live data stream being requested by the edge node; and (b) for issuing to a given entry point the subscription to the live data stream if the set reflector is not already receiving the live data stream, the subscription originating from the set reflector.

2. The subscription mechanism as described in claim 1 wherein the edge node also includes code for routing the live data stream received from at least one set reflector to the edge node server.

3. The subscription mechanism as described in claim 1 wherein the set reflector also includes code for routing the live data stream received from the given entry point to the edge node.

4. The subscription mechanism as described in claim 1 further including code operative at the given entry point for routing the live data stream to the set reflector in response to receipt of the subscription.

5. The subscription mechanism as described in claim 1 wherein the code operative at the edge node includes code for determining a preferred set of set reflectors to which the subscription is to be issued.

6. A subscription mechanism for use in a content delivery network (CDN) having a set of content provider entry points, an intermediate layer of set reflectors, and a set of edge nodes to which requesting end users are selectively directed to obtain live data streams that are published to the CDN, wherein an edge node includes a server for delivering the live data streams to requesting end users, the mechanism comprising:

code operative at the edge node (a) for determining whether the edge node server is already receiving a live data stream being requested by an end user at the time of such a request from the end user, (b) for issuing to at least one set reflector a subscription to the live data stream if the edge node server is not already receiving the live data stream, the subscription originating from the edge node, and (c) for routing the live data stream to the edge node server upon receipt of the live data stream from the set reflector;

code operative at the set reflector for (a) determining whether the set reflector is already receiving the live data stream being requested by the edge node, (b) for issuing to a given entry point the subscription to the live data stream if the set reflector is not already receiving the live data stream, and (c) for routing the live data stream to the edge node upon receipt of the live data stream from the given entry point; and code operative at the given entry point for routing the live data stream to the set reflector in response to receipt of the subscription.

7. The subscription mechanism as described in claim 6 wherein the routing code in the edge node, the set reflector and the given entry point is a UDP packet router.

8. The subscription mechanism as described in claim 6 wherein the server is a streaming media server that delivers streaming media in a given format, wherein the given format is selected from the set of formats consisting of Windows Media, RealSystem and QuickTime.

9. The subscription mechanism as described in claim 6 wherein the code operative at the edge node includes code for determining a preferred set of set reflectors to which the subscription is to be issued.

* * * * *